US008290768B1

(12) United States Patent
Nelken

(10) Patent No.: US 8,290,768 B1
(45) Date of Patent: Oct. 16, 2012

(54) SYSTEM AND METHOD FOR DETERMINING A SET OF ATTRIBUTES BASED ON CONTENT OF COMMUNICATIONS

(75) Inventor: Yoram Nelken, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 2488 days.

(21) Appl. No.: 10/112,230

(22) Filed: Mar. 27, 2002

Related U.S. Application Data

(63) Continuation-in-part of application No. 09/602,588, filed on Jun. 21, 2000.

(51) Int. Cl.
*G06F 17/27* (2006.01)
(52) U.S. Cl. ............... 704/9; 704/1; 704/10; 707/706; 707/707; 707/708; 715/255
(58) Field of Classification Search ............... 707/1–6, 707/706–708; 704/1, 9, 10; 715/255
See application file for complete search history.

(56) References Cited

U.S. PATENT DOCUMENTS

| | | |
|---|---|---|
| 3,648,253 A | 3/1972 | Mullery et al. |
| 4,110,823 A | 8/1978 | Cronshaw et al. |
| 4,286,322 A | 8/1981 | Hoffman et al. |
| 4,586,160 A | 4/1986 | Amano et al. |
| 4,642,756 A | 2/1987 | Sherrod |
| 4,658,370 A | 4/1987 | Erman et al. |
| 4,724,523 A | 2/1988 | Kucera |
| 4,805,107 A | 2/1989 | Kieckhafer et al. |
| 4,814,974 A | 3/1989 | Narayanan et al. |
| 4,908,865 A | 3/1990 | Doddington et al. |
| 4,918,735 A | 4/1990 | Morito et al. |
| 4,942,527 A | 7/1990 | Schumacher |
| 4,984,178 A | 1/1991 | Hemphill et al. |
| 5,018,215 A | 5/1991 | Nasr et al. |
| 5,023,832 A | 6/1991 | Fulcher et al. |

(Continued)

FOREIGN PATENT DOCUMENTS

CA 2180392 2/2001

(Continued)

OTHER PUBLICATIONS

Webster's Third New International Dictionary, G.&C. Meriam Company, 1961, pp. 538, 834, 1460.

(Continued)

*Primary Examiner* — David R Hudspeth
*Assistant Examiner* — Lamont Spooner
(74) *Attorney, Agent, or Firm* — Gates & Cooper LLP

(57) ABSTRACT

A system and method for determining a set of attributes to a communication includes a decision engine, a monitoring module, and application software. The decision engine receives communications and assigns a set of attributes to each received communication. Each communication and associated set of attributes is sent to the communication's corresponding application which processes the set of attributes for performing an action, such as display. The monitoring module monitors an item selected by the system user. The monitoring module may feed the selected item and associated communication back to the decision module. The decision engine may process the feedback on-line or in real-time. The decision module is a learning system that updates classification criteria using feedback. Classification scores associated with each set of attributes may represent an estimate of the statistical likelihood that each attribute is the proper response to the communication.

50 Claims, 8 Drawing Sheets

U.S. PATENT DOCUMENTS

| | | | |
|---|---|---|---|
| 5,040,141 A | 8/1991 | Yazima et al. |
| 5,051,924 A | 9/1991 | Bergeron et al. |
| 5,060,155 A | 10/1991 | Van Zuijlen |
| 5,067,099 A | 11/1991 | McCown et al. |
| 5,068,789 A | 11/1991 | van Vliembergen |
| 5,099,425 A | 3/1992 | Kanno: Yuji et al. |
| 5,101,349 A | 3/1992 | Tokuume et al. |
| 5,111,398 A | 5/1992 | Nunberg et al. |
| 5,125,024 A | 6/1992 | Gokcen et al. |
| 5,210,872 A | 5/1993 | Ferguson et al. |
| 5,228,116 A | 7/1993 | Harris et al. |
| 5,230,054 A | 7/1993 | Tamura |
| 5,247,677 A | 9/1993 | Welland et al. |
| 5,251,129 A | 10/1993 | Jacobs |
| 5,251,131 A | 10/1993 | Masand et al. |
| 5,265,033 A | 11/1993 | Vajk et al. |
| 5,278,942 A | 1/1994 | Bahl et al. |
| 5,287,430 A | 2/1994 | Iwamoto |
| 5,321,608 A | 6/1994 | Namba et al. |
| 5,325,298 A | 6/1994 | Gallant |
| 5,325,526 A | 6/1994 | Cameron et al. |
| 5,345,501 A | 9/1994 | Shelton |
| 5,349,526 A | 9/1994 | Potts et al. |
| 5,365,430 A | 11/1994 | Jagadish |
| 5,369,570 A | 11/1994 | Parad |
| 5,369,577 A | 11/1994 | Kadashevich et al. |
| 5,371,807 A | 12/1994 | Register et al. |
| 5,377,354 A | 12/1994 | Scannell et al. |
| 5,418,717 A | 5/1995 | Su et al. |
| 5,418,948 A | 5/1995 | Turtle |
| 5,437,032 A | 7/1995 | Wolf et al. |
| 5,444,820 A | 8/1995 | Tzes et al. |
| 5,475,588 A | 12/1995 | Schabes et al. |
| 5,483,466 A | 1/1996 | Kawahara et al. |
| 5,487,100 A | 1/1996 | Kane |
| 5,493,677 A | 2/1996 | Balogh et al. |
| 5,493,692 A | 2/1996 | Theimer et al. |
| 5,506,787 A | 4/1996 | Muhlfeld et al. |
| 5,526,521 A | 6/1996 | Fitch et al. |
| 5,542,088 A | 7/1996 | Jennings, Jr. et al. |
| 5,555,344 A | 9/1996 | Zunkler |
| 5,559,710 A | 9/1996 | Shahraray et al. |
| 5,577,241 A | 11/1996 | Spencer |
| 5,590,055 A | 12/1996 | Chapman et al. |
| 5,594,641 A | 1/1997 | Kaplan et al. |
| 5,596,502 A | 1/1997 | Koski et al. |
| 5,610,812 A | 3/1997 | Scabes et al. |
| 5,615,360 A | 3/1997 | Bezek et al. |
| 5,627,914 A | 5/1997 | Pagallo |
| 5,630,128 A | 5/1997 | Farrell et al. |
| 5,634,053 A | 5/1997 | Noble et al. |
| 5,634,121 A | 5/1997 | Tracz et al. |
| 5,636,124 A | 6/1997 | Rischar et al. |
| 5,649,215 A | 7/1997 | Itoh |
| 5,664,061 A | 9/1997 | Andreshak et al. |
| 5,680,628 A | 10/1997 | Carus et al. |
| 5,687,384 A | 11/1997 | Nagase |
| 5,694,616 A | 12/1997 | Johnson et al. |
| 5,701,400 A | 12/1997 | Amado |
| 5,708,829 A | 1/1998 | Kadashevich |
| 5,715,371 A | 2/1998 | Ahamed et al. |
| 5,721,770 A | 2/1998 | Kohler |
| 5,721,897 A | 2/1998 | Rubinstein |
| 5,724,481 A | 3/1998 | Garberg et al. |
| 5,737,621 A | 4/1998 | Kaplan et al. |
| 5,737,734 A | 4/1998 | Schultz |
| 5,745,652 A | 4/1998 | Bigus |
| 5,745,736 A | 4/1998 | Picart |
| 5,748,973 A | 5/1998 | Palmer et al. |
| 5,754,671 A | 5/1998 | Higgins et al. |
| 5,761,631 A | 6/1998 | Nasukawa |
| 5,765,033 A | 6/1998 | Miloslavsky |
| 5,768,578 A | 6/1998 | Kirk et al. |
| 5,794,194 A | 8/1998 | Takebayashi et al. |
| 5,799,268 A | 8/1998 | Boguraev |
| 5,802,253 A * | 9/1998 | Gross et al. .................. 706/47 |
| 5,806,040 A | 9/1998 | Vensko |
| 5,809,462 A | 9/1998 | Nussbaum |
| 5,809,464 A | 9/1998 | Kopp et al. |
| 5,822,731 A | 10/1998 | Schultz |
| 5,822,745 A | 10/1998 | Hekmatpour |
| 5,826,076 A | 10/1998 | Bradley et al. |
| 5,832,220 A | 11/1998 | Johnson et al. |
| 5,832,470 A * | 11/1998 | Morita et al. .................. 707/1 |
| 5,835,682 A | 11/1998 | Broomhead et al. |
| 5,845,246 A | 12/1998 | Schalk |
| 5,850,219 A | 12/1998 | Kumomura |
| 5,860,059 A | 1/1999 | Aust et al. |
| 5,864,848 A | 1/1999 | Horvitz et al. |
| 5,864,863 A | 1/1999 | Burrows |
| 5,867,495 A | 2/1999 | Elliott et al. |
| 5,878,385 A | 3/1999 | Bralich et al. |
| 5,878,386 A | 3/1999 | Coughlin |
| 5,884,032 A | 3/1999 | Bateman et al. |
| 5,884,302 A | 3/1999 | Ho |
| 5,890,142 A | 3/1999 | Tanimura et al. |
| 5,890,147 A | 3/1999 | Peltonen et al. |
| 5,895,447 A | 4/1999 | Ittycheriah et al. |
| 5,899,971 A | 5/1999 | De Vos |
| 5,913,215 A | 6/1999 | Rubinstein et al. |
| 5,920,835 A | 7/1999 | Huzenlaub et al. |
| 5,933,822 A | 8/1999 | Braden-Harder et al. |
| 5,940,612 A | 8/1999 | Brady et al. |
| 5,940,821 A | 8/1999 | Wical |
| 5,944,778 A | 8/1999 | Takeuchi et al. |
| 5,946,388 A | 8/1999 | Walker et al. |
| 5,948,058 A | 9/1999 | Kudoh et al. |
| 5,950,184 A | 9/1999 | Kartutunen |
| 5,950,192 A | 9/1999 | Moore et al. |
| 5,956,711 A | 9/1999 | Sullivan et al. |
| 5,960,393 A | 9/1999 | Cohrs et al. |
| 5,963,447 A | 10/1999 | Kohn et al. |
| 5,963,894 A | 10/1999 | Richardson et al. |
| 5,970,449 A | 10/1999 | Alleva et al. |
| 5,974,385 A | 10/1999 | Ponting et al. |
| 5,974,465 A | 10/1999 | Wong |
| 5,983,216 A | 11/1999 | Kirsch et al. |
| 5,991,713 A | 11/1999 | Unger et al. |
| 5,991,751 A | 11/1999 | Rivette et al. |
| 5,991,756 A | 11/1999 | Wu |
| 5,995,513 A | 11/1999 | Harrand et al. |
| 5,999,932 A | 12/1999 | Paul |
| 5,999,990 A | 12/1999 | Sharrit et al. |
| 6,006,221 A | 12/1999 | Liddy et al. |
| 6,009,422 A | 12/1999 | Ciccarelli |
| 6,012,053 A | 1/2000 | Pant et al. |
| 6,018,735 A | 1/2000 | Hunter |
| 6,021,403 A | 2/2000 | Horvitz et al. |
| 6,025,843 A | 2/2000 | Sklar |
| 6,026,388 A | 2/2000 | Liddy et al. |
| 6,032,111 A | 2/2000 | Mohri et al. |
| 6,035,104 A | 3/2000 | Zahariev |
| 6,038,535 A | 3/2000 | Campbell |
| 6,038,560 A | 3/2000 | Wical |
| 6,055,528 A | 4/2000 | Evans |
| 6,058,365 A | 5/2000 | Nagai et al. |
| 6,058,389 A | 5/2000 | Chandra et al. |
| 6,061,709 A | 5/2000 | Bronte |
| 6,064,953 A | 5/2000 | Maxwell, III et al. |
| 6,064,971 A | 5/2000 | Hartnett |
| 6,064,977 A | 5/2000 | Haverstock et al. |
| 6,067,565 A | 5/2000 | Horvitz |
| 6,070,149 A | 5/2000 | Tavor et al. |
| 6,070,158 A | 5/2000 | Kirsch et al. |
| 6,073,098 A | 6/2000 | Buchsbaum et al. |
| 6,073,101 A | 6/2000 | Maes |
| 6,073,142 A * | 6/2000 | Geiger et al. .................. 715/205 |
| 6,076,088 A | 6/2000 | Paik et al. |
| 6,081,774 A | 6/2000 | de Hita et al. |
| 6,085,159 A | 7/2000 | Ortega et al. |
| 6,092,042 A | 7/2000 | Iso |
| 6,092,095 A | 7/2000 | Maytal |
| 6,094,652 A | 7/2000 | Falsal |
| 6,098,047 A | 8/2000 | Oku et al. |
| 6,101,537 A | 8/2000 | Edelstein et al. |
| 6,112,126 A | 8/2000 | Hales et al. |
| 6,115,734 A | 9/2000 | Mansion |

| | | | |
|---|---|---|---|
| 6,138,128 A | 10/2000 | Perkowitz et al. | |
| 6,138,139 A | 10/2000 | Beck et al. | |
| 6,144,940 A | 11/2000 | Nishi et al. | |
| 6,148,322 A | 11/2000 | Sand et al. | |
| 6,151,538 A | 11/2000 | Bate et al. | |
| 6,154,720 A | 11/2000 | Onishi et al. | |
| 6,161,094 A | 12/2000 | Adcock et al. | |
| 6,161,130 A * | 12/2000 | Horvitz et al. | 709/206 |
| 6,163,767 A | 12/2000 | Tang et al. | |
| 6,167,370 A | 12/2000 | Tsourikov et al. | |
| 6,169,986 B1 | 1/2001 | Bowman et al. | |
| 6,182,029 B1 | 1/2001 | Friedman | |
| 6,182,036 B1 | 1/2001 | Poppert | |
| 6,182,059 B1 | 1/2001 | Angotti et al. | |
| 6,182,063 B1 | 1/2001 | Woods | |
| 6,182,065 B1 | 1/2001 | Yeomans | |
| 6,182,120 B1 | 1/2001 | Beaulieu et al. | |
| 6,185,603 B1 | 2/2001 | Henderson et al. | |
| 6,199,103 B1 | 3/2001 | Sakaguchi et al. | |
| 6,212,544 B1 | 4/2001 | Borkenhagen et al. | |
| 6,223,201 B1 | 4/2001 | Reznak | |
| 6,226,630 B1 | 5/2001 | Billmers | |
| 6,233,575 B1 | 5/2001 | Agrawal et al. | |
| 6,233,578 B1 | 5/2001 | Machihara et al. | |
| 6,236,987 B1 | 5/2001 | Horowitz et al. | |
| 6,243,679 B1 | 6/2001 | Mohri et al. | |
| 6,243,735 B1 | 6/2001 | Imanishi et al. | |
| 6,249,606 B1 | 6/2001 | Kiraly et al. | |
| 6,256,631 B1 | 7/2001 | Malcolm | |
| 6,256,773 B1 | 7/2001 | Bowman-Amuah | |
| 6,260,058 B1 | 7/2001 | Hoenninger et al. | |
| 6,263,335 B1 | 7/2001 | Paik et al. | |
| 6,269,368 B1 | 7/2001 | Diamond | |
| 6,271,840 B1 | 8/2001 | Finseth et al. | |
| 6,275,819 B1 | 8/2001 | Carter | |
| 6,278,973 B1 | 8/2001 | Chung et al. | |
| 6,282,565 B1 | 8/2001 | Shaw et al. | |
| 6,292,794 B1 | 9/2001 | Cecchini et al. | |
| 6,292,938 B1 | 9/2001 | Sarkar et al. | |
| 6,298,324 B1 | 10/2001 | Zuberec et al. | |
| 6,301,602 B1 | 10/2001 | Ueki | |
| 6,304,864 B1 | 10/2001 | Liddy et al. | |
| 6,304,872 B1 | 10/2001 | Chao | |
| 6,308,197 B1 | 10/2001 | Mason et al. | |
| 6,311,194 B1 | 10/2001 | Sheth et al. | |
| 6,314,439 B1 | 11/2001 | Bates et al. | |
| 6,314,446 B1 | 11/2001 | Stiles | |
| 6,324,534 B1 | 11/2001 | Neal et al. | |
| 6,327,581 B1 | 12/2001 | Platt | |
| 6,349,295 B1 | 2/2002 | Tedesco et al. | |
| 6,353,667 B1 | 3/2002 | Foster et al. | |
| 6,353,827 B1 | 3/2002 | Davies et al. | |
| 6,360,243 B1 | 3/2002 | Lindsley et al. | |
| 6,363,373 B1 | 3/2002 | Steinkraus | |
| 6,363,377 B1 | 3/2002 | Kravets et al. | |
| 6,366,910 B1 | 4/2002 | Rajaraman et al. | |
| 6,370,526 B1 | 4/2002 | Agrawal et al. | |
| 6,374,221 B1 | 4/2002 | Haimi-Cohen | |
| 6,377,945 B1 | 4/2002 | Rievik | |
| 6,393,415 B1 | 5/2002 | Getchius et al. | |
| 6,397,209 B1 | 5/2002 | Read et al. | |
| 6,397,212 B1 | 5/2002 | Biffar | |
| 6,401,084 B1 | 6/2002 | Ortega et al. | |
| 6,408,277 B1 | 6/2002 | Nelken | |
| 6,411,947 B1 | 6/2002 | Rice et al. | |
| 6,411,982 B2 | 6/2002 | Williams | |
| 6,415,250 B1 | 7/2002 | van den Akkar | |
| 6,418,458 B1 | 7/2002 | Maresco | |
| 6,421,066 B1 | 7/2002 | Silvan | |
| 6,421,675 B1 | 7/2002 | Ryan et al. | |
| 6,424,995 B1 | 7/2002 | Shuman | |
| 6,424,997 B1 * | 7/2002 | Buskirk et al. | 709/206 |
| 6,430,615 B1 | 8/2002 | Hellerstein et al. | |
| 6,434,435 B1 | 8/2002 | Tubel et al. | |
| 6,434,554 B1 | 8/2002 | Asami et al. | |
| 6,434,556 B1 | 8/2002 | Levin et al. | |
| 6,438,540 B2 | 8/2002 | Nasr et al. | |
| 6,438,575 B1 | 8/2002 | Khan et al. | |
| 6,442,542 B1 | 8/2002 | Ramani et al. | |
| 6,442,589 B1 | 8/2002 | Takahashi et al. | |
| 6,446,061 B1 | 9/2002 | Doerre et al. | |
| 6,446,081 B1 | 9/2002 | Preston | |
| 6,446,256 B1 | 9/2002 | Hyman et al. | |
| 6,449,589 B1 | 9/2002 | Moore | |
| 6,449,646 B1 | 9/2002 | Sikora et al. | |
| 6,460,074 B1 | 10/2002 | Fishkin | |
| 6,463,533 B1 | 10/2002 | Calamera et al. | |
| 6,466,940 B1 | 10/2002 | Mills | |
| 6,477,500 B2 | 11/2002 | Maes | |
| 6,477,580 B1 | 11/2002 | Bowman-Amuah | |
| 6,480,843 B2 | 11/2002 | Li | |
| 6,490,572 B2 | 12/2002 | Akkiraju et al. | |
| 6,493,447 B1 | 12/2002 | Goss et al. | |
| 6,493,694 B1 | 12/2002 | Xu et al. | |
| 6,496,836 B1 | 12/2002 | Ronchi | |
| 6,496,853 B1 | 12/2002 | Klein | |
| 6,499,021 B1 * | 12/2002 | Abu-Hakima | 706/10 |
| 6,505,158 B1 | 1/2003 | Conkie | |
| 6,507,872 B1 | 1/2003 | Geshwind | |
| 6,513,026 B1 | 1/2003 | Horvitz et al. | |
| 6,535,795 B1 | 3/2003 | Schroeder et al. | |
| 6,542,889 B1 | 4/2003 | Aggarwal et al. | |
| 6,553,358 B1 * | 4/2003 | Horvitz | 706/45 |
| 6,560,330 B2 | 5/2003 | Gabriel | |
| 6,560,590 B1 | 5/2003 | Shwe et al. | |
| 6,571,282 B1 | 5/2003 | Bowman-Amuah | |
| 6,574,480 B1 * | 6/2003 | Foladare et al. | 455/458 |
| 6,584,464 B1 | 6/2003 | Warthen | |
| 6,594,697 B1 | 7/2003 | Praitis et al. | |
| 6,601,026 B2 | 7/2003 | Appelt et al. | |
| 6,607,136 B1 * | 8/2003 | Atsmon et al. | 235/492 |
| 6,611,535 B2 | 8/2003 | Ljungqvist | |
| 6,611,825 B1 | 8/2003 | Billheimer et al. | |
| 6,615,172 B1 | 9/2003 | Bennett et al. | |
| 6,618,727 B1 | 9/2003 | Wheeler et al. | |
| 6,636,733 B1 * | 10/2003 | Helferich | 455/412.2 |
| 6,651,220 B1 | 11/2003 | Penteroudakis et al. | |
| 6,654,726 B1 | 11/2003 | Hazek | |
| 6,654,815 B1 | 11/2003 | Goss et al. | |
| 6,665,662 B1 | 12/2003 | Kirkwood et al. | |
| 6,675,159 B1 | 1/2004 | Lin et al. | |
| 6,704,728 B1 | 3/2004 | Chang et al. | |
| 6,711,561 B1 | 3/2004 | Chang et al. | |
| 6,714,643 B1 | 3/2004 | Gargeya et al. | |
| 6,714,905 B1 | 3/2004 | Chang et al. | |
| 6,738,759 B1 | 5/2004 | Wheeler et al. | |
| 6,742,015 B1 | 5/2004 | Bowman-Amuah | |
| 6,744,878 B1 | 6/2004 | Komissarchik et al. | |
| 6,745,181 B1 | 6/2004 | Chang et al. | |
| 6,748,387 B2 | 6/2004 | Garber et al. | |
| 6,766,320 B1 | 7/2004 | Wang et al. | |
| 6,785,671 B1 | 8/2004 | Bailey et al. | |
| 6,850,513 B1 | 2/2005 | Pelissier | |
| 6,862,710 B1 | 3/2005 | Machisio | |
| 7,047,242 B1 | 5/2006 | Ponte | |
| 7,051,277 B2 * | 5/2006 | Kephart et al. | 715/229 |
| 2001/0027463 A1 | 10/2001 | Kobayashi | |
| 2001/0042090 A1 | 11/2001 | Williams | |
| 2001/0047270 A1 | 11/2001 | Gusick et al. | |
| 2001/0056456 A1 | 12/2001 | Cota-Robles | |
| 2002/0029825 A1 * | 3/2002 | Kuehmann et al. | 148/226 |
| 2002/0032715 A1 | 3/2002 | Utsumi | |
| 2002/0049602 A1 * | 4/2002 | Horvitz | 705/1 |
| 2002/0052907 A1 | 5/2002 | Wakai et al. | |
| 2002/0059161 A1 | 5/2002 | Li | |
| 2002/0065953 A1 | 5/2002 | Alford et al. | |
| 2002/0073129 A1 | 6/2002 | Wang et al. | |
| 2002/0078119 A1 | 6/2002 | Brenner et al. | |
| 2002/0078121 A1 | 6/2002 | Ballantyne | |
| 2002/0078257 A1 | 6/2002 | Nishimura | |
| 2002/0083251 A1 | 6/2002 | Chauvel et al. | |
| 2002/0087618 A1 | 7/2002 | Bohm et al. | |
| 2002/0087623 A1 | 7/2002 | Eatough | |
| 2002/0091746 A1 | 7/2002 | Umberger et al. | |
| 2002/0099714 A1 | 7/2002 | Murray | |
| 2002/0103871 A1 | 8/2002 | Pustejovsky | |
| 2002/0107926 A1 | 8/2002 | Lee | |
| 2002/0116463 A1 | 8/2002 | Hart | |

| | | | |
|---|---|---|---|
| 2002/0150966 | A1 | 10/2002 | Muraca |
| 2002/0196911 | A1 | 12/2002 | Gao et al. |
| 2003/0028564 | A1 | 2/2003 | Sanfilippo |
| 2003/0046297 | A1 | 3/2003 | Mason |
| 2004/0167889 | A1 | 8/2004 | Chang et al. |
| 2004/0225653 | A1 | 11/2004 | Nelken et al. |
| 2004/0254904 | A1 | 12/2004 | Nelken et al. |
| 2005/0187913 | A1 | 8/2005 | Nelken et al. |

FOREIGN PATENT DOCUMENTS

| | | |
|---|---|---|
| EP | 0 597 630 | 5/1994 |
| EP | 0 304 191 | 2/1999 |
| JP | 09106296 | 4/1997 |
| WO | WO 00/36487 A2 | 6/2000 |
| WO | 01/84373 | 8/2001 |
| WO | 01/84374 | 8/2001 |

OTHER PUBLICATIONS

Computer Dictionary, Microsoft Press, 1997, Third Edition, p. 192.

Breese et al, "Empirical Analysis of Predictive Algorithms for Collaborative Filtering," Proc. of the 14th Conf. on Uncertainty in Artificial Intelligence, Jul. 1998.

Czerwinski et al, "Visualizing Implicit Queries for Information Management and Retrieval," Proc. of CHI 1999; ACM SIGCHI Conf. on Human Factors in Computing Systems, 1999.

Dumais et al., "Inductive Learning Algorithms and Representations for Task Categorization," Proc. of 7th Intl. Conf. on Information & Knowledge Management, 1998.

Horvitz, "Principles of Mixed-Initiative User Interfaces," Proc. of CHI 1999; ACM SIGCHI Conf. on Human Factors in Computing Systems, 1999.

Horvitz et al., "Display of Information for Time-Critical Decision Making," Proc. of the 11th Conf. on Uncertainty in Artificial Intelligence, Jul. 1995.

Horvitz et al., "The Lumiere Project: Bayesian User Modeling . . . ," Proc. of the 14th Conf. on Uncertainty in Artificial Intelligence, Jul. 1998.

Horvitz et al., "Time-Dependent Utility and Action Under Uncertainty," Proc. of the 7th Conf. on Uncertainty in Artificial Intelligence, Jul. 1991.

Horvitz et al., "Time-Critical Action: Representations and Application," Proc. of the 13th Conf. on Uncertainty in Artificial Intelligence, Jul. 1997.

Koller et al., "Toward Optimal Feature Selection," Proc. of 13th Conf. on Machine Learning, 1996.

Lieberman, "Letizia: An Agent That Assists in Web Browsing," Proc. of International Joint Conference on Artificial Intelligence, 1995.

Platt, "Fast Training of Support Vector Machines Using Sequential Minimal Optimization," Advances in Kernel Methods: Support Vector Learning, MIT Press, Cambridge, MA, 1999.

Platt, "Probabilistic Outputs for Support Vector Machines & Comparisons to Regularized Likelihood Methods," Adv. in Large Margin Classifiers, MIT Press, Cambridge, MA, 1999.

Sahami et al. "A Bayesian Approach to Filtering Junk E-Mail," Amer. Assoc. for Art. Intell. Technical Report WS-98-05, 1998.

Cohen, "Learning Rules that Classify E-Mail," AT&T Laboratories, 1996.

Lewis, "Evaluating and Optimizing Autonomous Text Classification Systems," ACM SIGIR, 1995.

Lewis et al., "Training Algorithms for Linear Text Classifiers," ACM SIGIR, 1996.

Apte et al., "Automated Learning of Decision Rules for Text Categorization," ACM Transactions on Information Systems, vol. 12, No. 3, 1994.

Losee, Jr., "Minimizing Information Overload: The Ranking of Electronic Messages," Journal of Information Science 15, 1989.

Joachimes, "Text Categorization with Support Vector Machines: Learning with Many Relevant Features," Universitat Dortmund, Germany, 1998.

U.S. Appl. No. 10/008,152, filed Dec. 4, 2001, Yoram Nelken, System and Method for Automatic Task Prioritization.

Moore et al., "Web Page Categorization and Feature Selection Using Association Rule and Principal Component Clustering," Proceedings of the 7th Workshop on Information Technologies and Systems, Dec. 1997.

Mase, "Experiments on Automatic Web Page Categorization for IR Systems," Technical Report, Stanford University, 1998.

Berners-Lee et al., "The Semantic Web," Scientific American.com, May 17, 2001.

Brasethvik et al., "A Conceptual Modeling Approach to Semantic Document Retrieval," Proceedings of the 14th International Conference on Advanced Information Systems Engineering, May 27-31, 2002.

"Grammar-like Functional Rules for Representing Query Optimization Alternative," 1998 ACM, pp. 18-27.

Khan et al., "Personal Adaptive Web Agent: A Tool for Information Filtering," Canadian Conference on Electrical and Computer Engineering, vol. 1, May 25, 1997, pp. 305-308.

Davies et al., "Knowledge Discovery and Delivery," British Telecommunications Engineering, London, GB, vol. 17, No. 1, Apr. 1, 1998, pp. 25-35.

Persin, "Document Filtering for Fast Ranking," Sigir 94. Dublin, Jul. 3-6, 1994, Proceedings of the Annual International ACM-Sigir Conference on Research and Development in Information Retrieval, Berlin, Springer, DE, vol. CONF. 17, Jul. 3, 1994, pp. 339-348.

Han et al., "WebACE: A Web Agent for Document Categorization and Exploration," Proceedings of the 2nd International Conference on Autonomous Agents Minneapolis/St. Paul, MN, May 9-13, 1998, Proceedings of the International Conference on Autonomous Agents, New York, NY, May 9, 1998, pp. 408-415.

Shimazu et al., "CAPIT: Natural Language Interface Design Tool with Keyword Analyzer and Case-Based Parser," NEC Research and Development, Nippon Electric Ltd., Tokyo, JP, vol. 33, No. 4, Oct. 1, 1992, pp. 679-688.

Firepond eService Provider, http:/ /www.firepond.com/products/eserviceperformer.

Banter White Paper:, "Natural Language Engines or Advanced Customer Interaction," by Banter Inc.

Banter Technology RME, "The Foundation for Quality E-Communications," Technical White Paper.

Webster's Computer Internet Dictionary, 3rd Edition, P.E. Margolis, 1999.

Morelli et al., "Predicting Technical Communication in Product Development Organizations," IEEE Transactions on Engineering Management, vol. 42, issue 3, Aug. 1995.

Parmentier et al., "Logical Structure Recognition of Scientific Bibliographic References," 4th Int'l. Conf. on Document Analysis and Recognition, vol. 2, Aug. 18-20, 1997.

Kalogeraki et al., "Using Multiple Feedback Loops for Object Profiling . . . ," IEEE Int'l Symposium on Object-Oriented Real-Time Distributed Computing, May 2-5, 1999.

Johnson et al., "Adaptive Model-Based Neural Network Control," IEEE Int'l Conf. on Robotics and Automation, May 13-18, 1990.

McKinnon et al., "Data Communications and Management of a Distributed Network of Automated Data Acquisition Systems," 1997 IEEE Nuclear Science Symp., Nov. 1997.

searchCRM.com Definitions (contact center), http://www.searchcrm.techtatget.com.

"Transforming Your Call Center Into a Contact Center: Where Are You? Trends and Recommendations," An IDC Executive Brief (#33), Jun. 2001.

Hawkins et al., "The Evolution of the Call Center to the 'Customer Contact Center'", ITSC White Paper, Feb. 2001.

\* cited by examiner

SYSTEM AND METHOD FOR DETERMINING A SET OF ATTRIBUTES BASED ON CONTENT OF COMMUNICATIONS

CROSS-REFERENCE TO RELATED APPLICATION

This application is a continuation-in-part of U.S. patent application Ser. No. 09/602,588, filed Jun. 21, 2000, and entitled "System and Method for Automatic Task Prioritization," and relates to U.S. patent application Ser. No. 09/754,179, filed Jan. 3, 2001, entitled "System and Method for Electronic Communication Management." The subject matter of the related applications is hereby incorporated by reference.

BACKGROUND OF THE INVENTION

1. Field of the Invention

This invention relates generally to electronic systems, and relates more particularly to a system and method for determining a set of attributes based on content of communications.

2. Description of the Background Art

Users of PCs, workstations, laptops, and other electronic devices may send and receive electronic communications such as e-mail, voice over Internet protocol (VoIP) messages, facsimiles (faxes), HTML-formatted documents, text documents, spread-sheet type documents, and other types of documents and communications via transmission media such as twisted-pair wire, coaxial cable, and wireless. The continued growth of communication traffic is fueled by the proliferation of electronic devices with Internet access and multimedia capabilities, increases in home and business networking, access to broadband transmission, and e-commerce activity. For example, a user of an electronic device may receive a communication over broadband digital subscriber line (DSL) from a first device connected to a wide-area network (WAN) such as the Internet, or the user may receive a communication over an Ethernet connection from a second device connected to a local area network (LAN).

In other words, the volume of electronic communications received by electronic devices is increasing due to an increase in networked, multimedia-capable, electronic devices operating in a environment of global connectivity with high transmission bandwidth. The growth in volume of electronic communications, including document transfers, appears unbounded. The organization of large volumes of multimedia communications received and processed by users of electronic devices is particularly time consuming. For example, users spend time analyzing each communication for content before categorizing and saving communications to file folders. This task becomes burdensome when large amounts of electronic communications are received by electronic devices. It would be advantageous to automate the organization of electronic communications and documents received by electronic devices to assist in the task of filing or responding to the wide variety of communications.

SUMMARY OF THE INVENTION

The present invention provides a system and method for analyzing communications and assigning a set of attributes to each communication. The system of the invention includes a decision engine, a monitoring module, and application software. The decision engine receives communications and assigns a set of attributes to each communication. A communication may be an e-mail, an e-mail attachment, a word-processed document, a fax, a voice message, an HTML-based document, or other type of multimedia data.

In one embodiment, the decision engine includes a communication analyzer that identifies concepts in each communication and relationships between the concepts. In one embodiment, the communication analyzer includes a natural language processor for analyzing text-based communications expressed in natural language.

Each communication and its associated set of attributes is sent to the communication's corresponding application software for processing. The application software, with assistance from an associated application plug-in, for example, performs an action according to the set of attributes. For example, the set of attributes may be displayed to the user. The set of attributes may be an ordered list of file folders, an ordered list of actions, or user-interface configurations of user-interface components that may reflect the set of attributes. In one embodiment, a user selects an item from the displayed set of attributes while the monitoring module monitors the action. The monitoring module feeds back this information to the decision module and the feedback is processed "online." For example, the decision engine may buffer the feedback received from the monitoring module, and process the feedback at a later time in an "on-line" manner without an interruption of decision engine service. In another embodiment of the invention, the decision engine may process the feedback in real-time.

In one embodiment of the invention, the decision module is a learning system that uses feedback from the monitoring module to update classification criteria. The decision module learns the classification criteria of the system user by associating the item selected from the set of attributes with the content of the communication. Thus, based on the system user's selections of items from the set of attributes, the decision engine will automatically update its classification criteria.

In another embodiment, the decision engine may be a rule-based system that classifies each communication according to a predetermined set of rules. In this embodiment, a change in the system user's classification criteria requires changes to the rules of the decision engine. In a further embodiment of the invention, the decision engine may include a rule-based system that is supplemented by a learning system. In this embodiment, rules may be used to determine a set of attributes until the learning system has received sufficient feedback to make classification decisions, or the rules may establish general guidelines that are further refined by feedback.

DETAILED DESCRIPTION OF THE INVENTION

Figure 1:
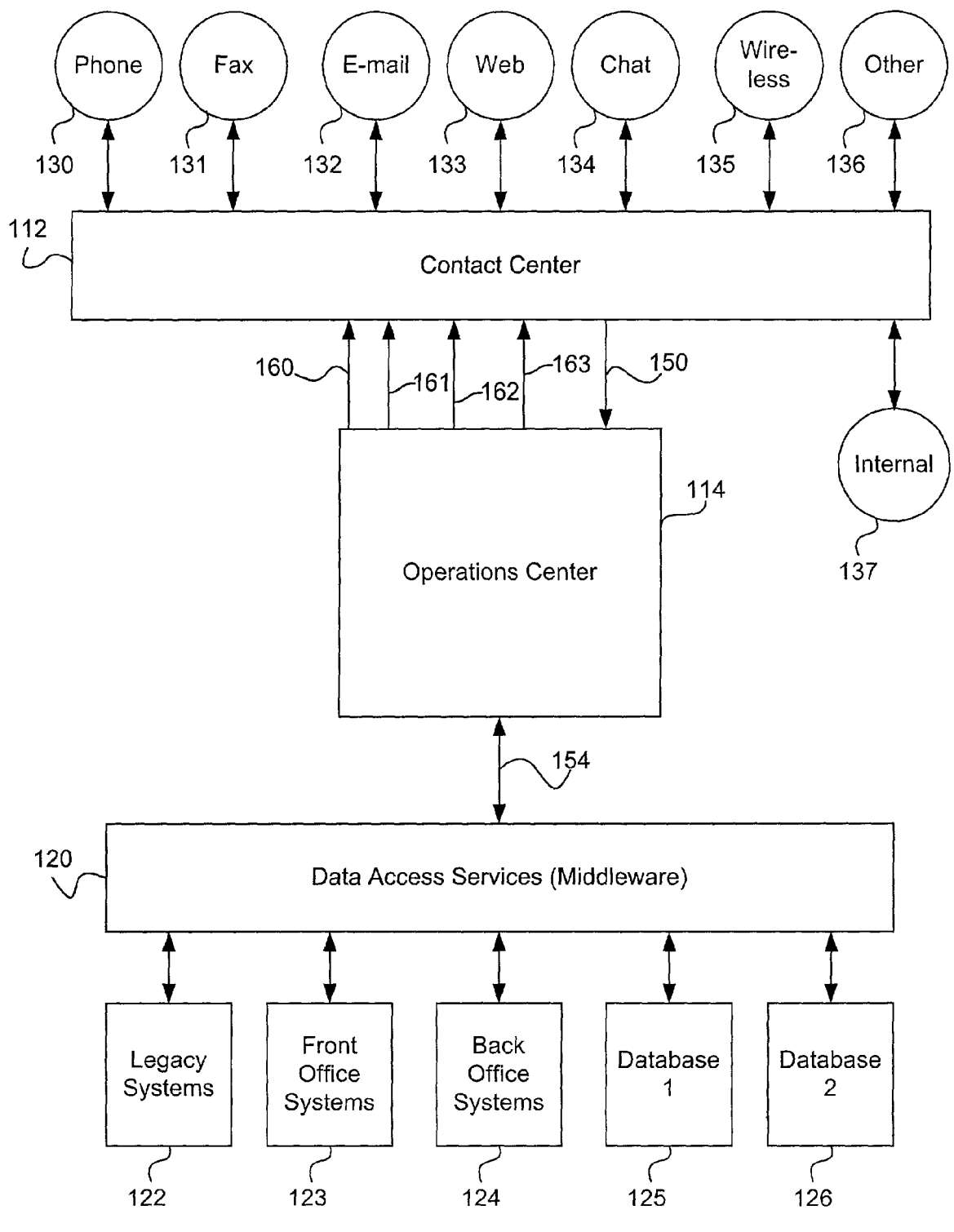
FIG. 1 is a block diagram of one embodiment of an electronic interaction system, in accordance with the present invention.

FIG. 1 is a block diagram of one embodiment of an electronic interaction system 100 which includes, but is not limited to, a contact center 112, an operations center 114, and data access services (middleware) 120. System 100 may also include legacy systems 122, front office systems 123, back office systems 124, and databases 125, 126. Contact center 112 may interact with other parties via various communication channels. The channels include, but are not limited to, a telephone (phone) 130 channel, a facsimile (fax) 131 channel, an E-mail 132 channel, a web-based communication (web) 133 channel such as the Internet, a chat communication (chat) 134 channel, a wireless 135 channel, and other multimedia channels. Other 136 forms of communication channels, for example, a news wire service, are within the scope of the invention. Contact center 112 may also interact with electronic interaction system 100's memory (not shown) or data storage areas (not shown) via internal communication channel 137. For example, a document created with a word processing application (not shown) can be processed by operations center 114 via internal channel 137 and contact center 112.

Communications received by contact center 112 may be text-based data, phone data, image data, voice-over Internet protocol (VoIP) data, or other multimedia data. For example, the text-based data includes ASCII documents transmitted using a TCP/IP or FTP communications standard over a network such as the Internet. Voice communications received by contact center 112 may require some action by electronic interaction system 100. For example, contact center 112 may include a speech recognition module that converts a voice communication into a text communication. A communication may be an e-mail, an e-mail attachment, a word-processed document, a fax, a voice message, an HTML-based document, or other type of multimedia data.

Contact center 112 may receive communications from sources external or internal to electronic interaction system 100. For example, the communication may be from an external source, such as an e-mail, a fax, or a HTML-formatted document downloaded from a Web site on the World Wide Web, or the communication may be from an internal source such as a word-processed document saved in a data storage area (not shown) and received by contact center 112 via internal channel 137.

Contact center 112 forwards the received communications to operations center 114 via path 150. The functionality of operations center 114 is described further below in conjunction with FIG. 2A. The data access services 120 may access legacy systems 122, front office systems 123, back office systems 124, and databases 125, 126 to store and retrieve data. Data access services 120 may also provide information to operations center 114 via path 154. In addition, operations center 114 may change data stored in electronic interaction system 100.

In another embodiment of electronic interaction system 100, contact center 112 is a network interface that allows operations center 114 to receive communications, including documents, via various networks, such as local-area networks (LANs), wide-area networks (WANs), and wireless networks.

Figure 2A:
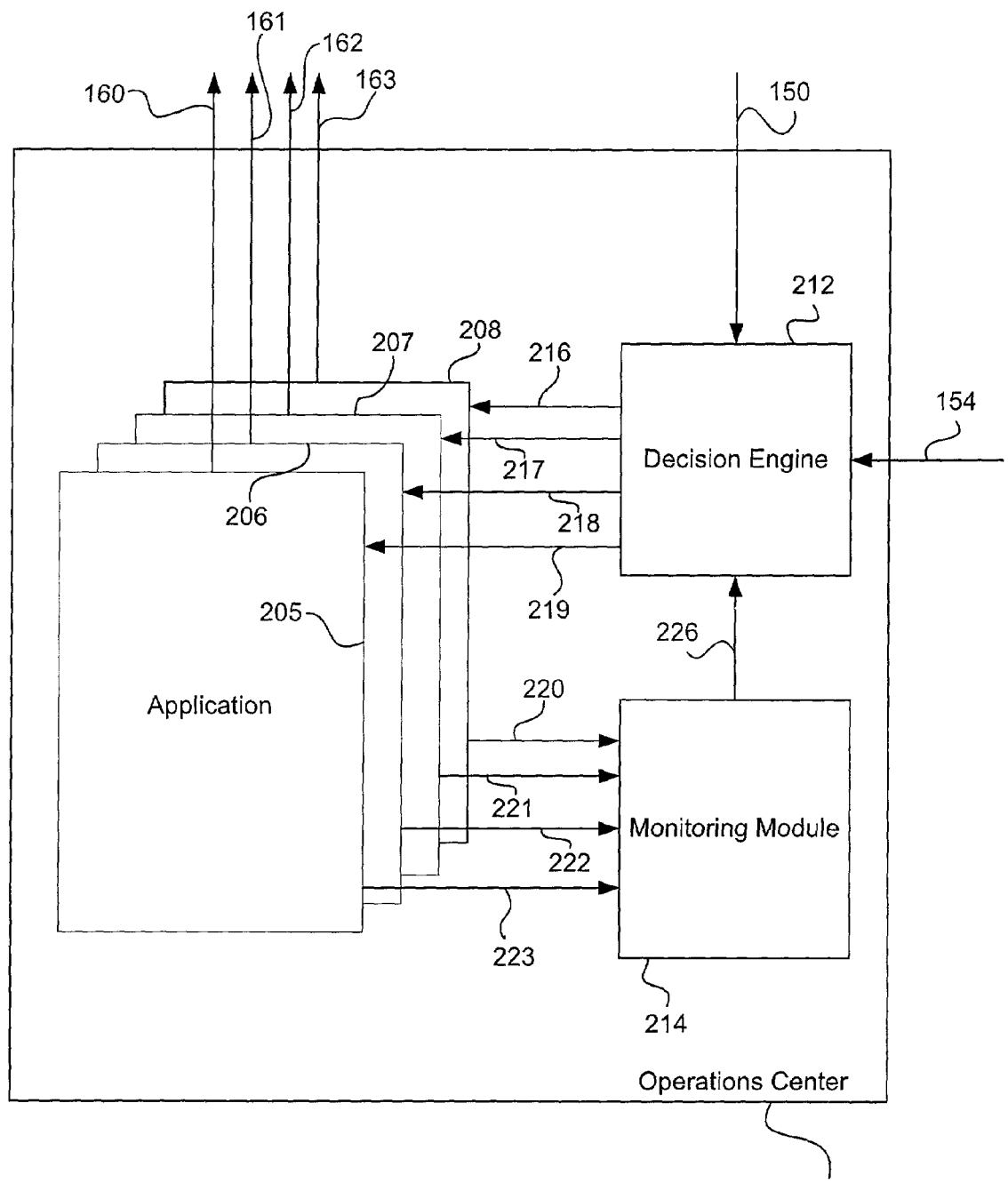
FIG. 2A is a block diagram of one embodiment of the operations center of FIG. 1, in accordance with the invention.

FIG. 2A is a block diagram of one embodiment of operations center 114 of FIG. 1, in accordance with the invention. Operations center 114 includes, but is not limited to, applications 205, 206, 207, and 208, a decision engine 212, and a monitoring module 214. Four applications 205, 206, 207, and 208 are shown in FIG. 2A, however, any number of applications is within the scope of the present invention.

Decision engine 212 receives a communication, such as a text-based document, from contact center 112 via path 150. Decision engine 212 analyzes each communication, and then assigns a set of attributes to each communication based on the content of the communication. Decision engine 212 may also receive data from data access services 120 via path 154. Data received via path 154 is preferably associated with a particular communication. For example, a communication may include a request that a previous communication, now stored in one of the databases or systems accessible to data access services 120, be referenced or linked to the current communication. The contents and functionality of decision engine 212 are further discussed below in conjunction with FIG. 3.

Decision engine 212 sends each communication to its corresponding application via path 216, 217, 218, or 219. For example, if the communication is an e-mail document, decision engine 212 sends the e-mail document with its associated set of attributes to an e-mail application. However, if the communication is a document downloaded from a Web site, then decision engine 212 sends the Web-based document with its associated set of attributes to a Web-browser application. Upon receiving the communication and its associated set of attributes, the application processes the communication and the set of attributes for performing an action, such as displaying the set of attributes on a monitor (not shown). The set of attributes may include items such as folders, names, queues, or actions—organized as lists, tables, or user-interface (UI) components, among others.

In one embodiment, upon receiving a communication and its associated set of attributes from decision engine 212, an application processes the communication and the set of attributes for performing an action. In this embodiment, the set of attributes is an ordered list of actions where each action has a classification score. If the highest classification score is higher than a threshold determined by the system user, the application automatically performs the action with the highest classification score (i.e., the first listed action). For example, decision engine 212 may analyze a received e-mail document and assign a set of attributes to the email document where the first listed action is "delete." If the classification score of the "delete" action is higher than the user's threshold, then the e-mail application automatically deletes the e-mail document.

In another embodiment, upon receiving a communication and its associated set of attributes from decision engine 212, the application processes the document and the set of attributes for performing the action of displaying the set of attributes. For example, upon receiving an e-mail and its associated set of attributes from decision engine 212, the e-mail application processes the e-mail document and the set of attributes for display. If the set of attributes is a list of folders, decision engine 212 generates an ordered list of folders, based upon the content of the e-mail and decision engine 212's classification criteria, and the e-mail application displays the ordered list of folders, via a pull-down menu, into which the user may save the e-mail, for example. Decision engine 212's classification criteria may include classification rules, classification databases developed from decision engine 212's learning and training process using feedback from received communications (discussed further below in conjunction with FIG. 3), and statistical models stored in decision engine 212 that are configured to classify the communications based on the concepts and relationships identified by decision engine 212, and to predict responses and actions to the received communications. In one embodiment, decision engine 212 uses classification criteria developed for one type of communication, for example an e-mail communication, to develop classification criteria for other types of communications, for example Web-based communications. Alternatively, decision engine 212 generates an ordered list of actions that are processed by the e-mail application for display. Actions include delete, forward, or reply responses. Decision engine 212 bases the selection of the actions upon content of the e-mail and the classification criteria. Alternatively, decision engine 212 may determine a set of attributes that, when received and processed by the e-mail application, configures user-interface (UI) components associated with the e-mail application's user interface as displayed on the monitor. A configuration of UI components includes an arrangement of buttons and/or icons of the user interface, functionality or color of the buttons/icons, and shapes of the buttons/icons of the user interface or other components that comprise the user interface, based upon the content of the e-mail and the classification criteria.

The user of electronic interaction system 100 may further process the communication by selecting a displayed folder or action from the ordered list or a button or icon from the user interface, or by selecting a folder or an action that is or is not displayed. For example, when the communication received by electronic interaction system 100 is an e-mail from the system user's mother, the e-mail application processes an ordered list of file folders for display, such as "mom," "relative," "garden," and "personal," listed according to a classification score, from highest classification score to lowest classification score. This ordered list of folders is generated by decision engine 212 based on the content of the e-mail and on the classification criteria. For example, the header of the e-mail designates the system user's mother as the sender, the body of the e-mail includes discourses on the system user's relatives and mother's garden, and the e-mail is electronically signed by the system user's mother. In addition, the system user's mother is on vacation in Florida and is accessing a mail server on the Internet via a local Florida Internet Service Provider (ISP). The system user may decide to save the e-mail to the folder entitled "mom" by selecting the "mom" folder from the displayed ordered list of folders. Alternatively, the system user may decide that the system user's mother's discussion of the benefits of organic mulching of red beets is particularly enlightening, and therefore the system user saves the e-mail to the "garden" folder, which decision engine 212 listed lower in the ordered list of folders. Or the system user may wish to save the e-mail to a new folder that is not included in the displayed ordered list of folders, and therefore the system user creates a new folder entitled "Florida" in which to save the e-mail. Or finally, for example, the system user may decide to reply to the e-mail by selecting the reply action item displayed in an ordered list of action items. An exemplary UI is discussed further below in conjunction with FIG. 2B.

Monitoring module 214 monitors the items selected from the set of attributes by each system user via paths 220, 221, 222, and 223. Each selected item and its associated communication are noted by monitoring module 214 and fed back via path 226 to decision engine 212. Decision engine 212 analyzes each selected item and its associated communication to improve the accuracy of its classification.

By generating a set of attributes associated with each communication and sending the set of attributes and the communication to the communication's corresponding application, decision engine 212 advantageously allows the users of electronic interaction system 100 to more efficiently identify relevant items, such as folders or actions, enabling the system user to act on communications efficiently and expeditiously.

This advantage is especially apparent when the system user receives a large amount of e-mails, voice messages, faxes, or other communications. In many instances, the system user will select items from the displayed set of attributes which is consistent with decision engine 212's classification. However, the ordering of items, the inclusion of items, or the exclusion of items on a list associated with a given communication may be fine-tuned by the actions of the system user, such as the system user's personal selection of items from the displayed set of attributes. The impact of a system user's classification judgment realized by selecting items from the set of attributes is further discussed below in conjunction with FIG. 3.

Figure 2B:
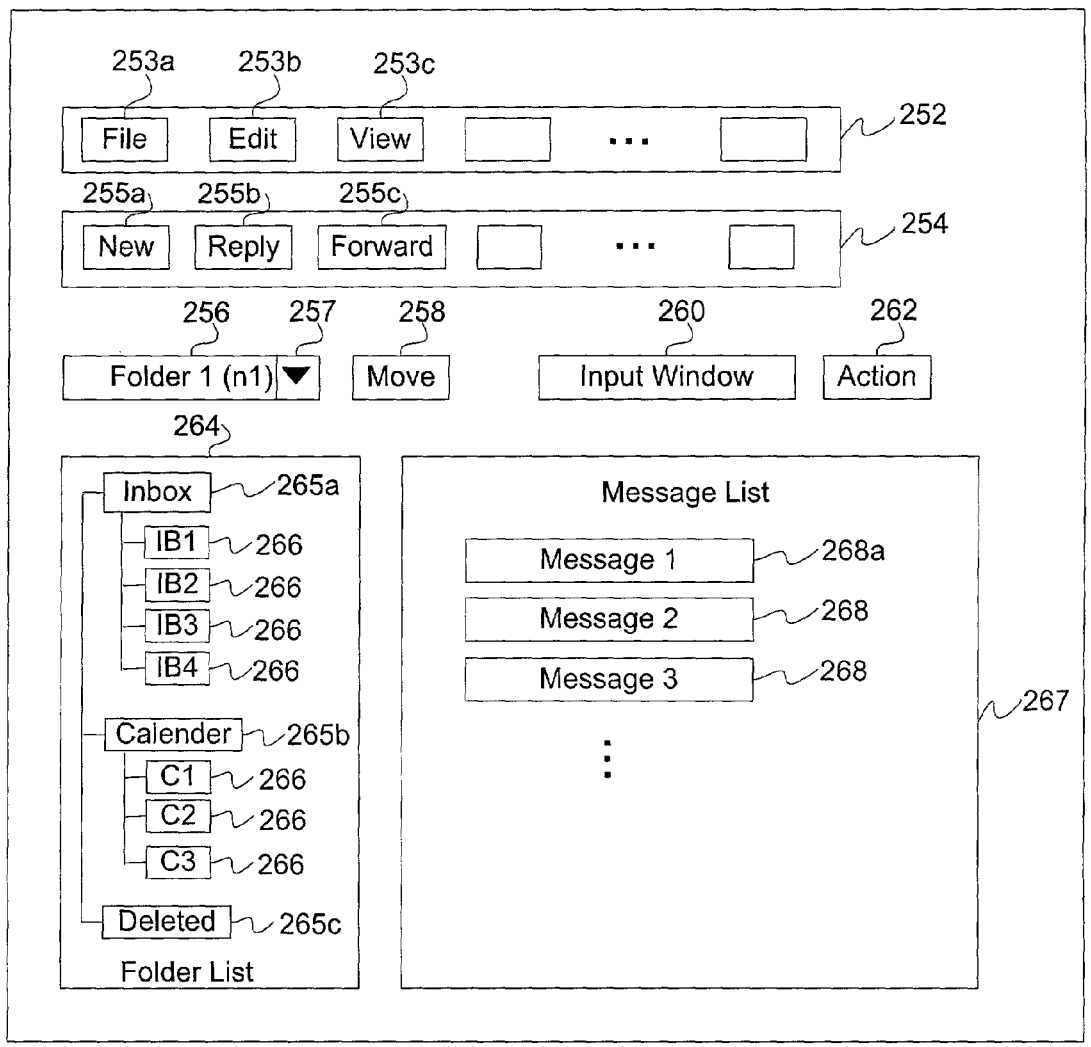
FIG. 2B illustrates one embodiment of a user-interface associated with an application of FIG. 2A, in accordance with the invention.

FIG. 2B illustrates one embodiment of a UI 250 associated with an e-mail application and including an ordered list of folders. However, the scope of the invention covers other ordered items and various other configurations of buttons, windows, icons, lists, tables, controls, and consoles. UI 250 includes a console A 252, a console B 254, an ordered folder list 256, a move button 258, an input window 260, an action button 262, a folder list 264, and a message list 267. Console A 252 includes edit, command, and management (ECM) buttons 253 such as a file button 253*a*, an edit button 253*b*, and a view button 253*c*, for example. ECM buttons 253, when selected by a user, may display pull-down menus. Console B 254 includes action buttons 255 such as a new button 255*a*, a reply button 255*b*, and a forward button 255*c*, among others. Ordered folder list 256 includes one or more folders with associated classification scores, such as folder 1 with an associated classification score n1, and may include a down arrow button 257. For example, when a user engages down arrow button 257, an ordered list of folders is displayed via a pull-down menu as discussed below in conjunction with FIG. 2C. The ordered list of folders is associated with one of a plurality of messages 268 displayed in message list 267 and highlighted by a user, such as e-mail message 1 268*a*.

In addition, the configuration and functionality of UI 250 may change based upon the content of e-mail message 1 268*a*. For example, a "reply to all" button may appear in UI 250 if decision engine 212 determines, based on the content of e-mail message 1 268*a*, that a user may send a reply e-mail message to more than one recipient.

Figure 2C:
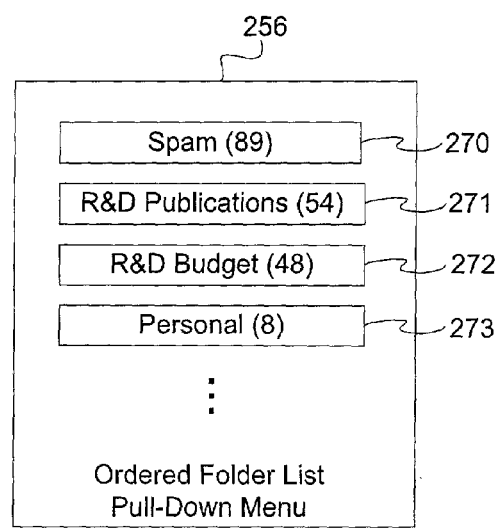
FIG. 2C illustrates a pull-down menu of the ordered list of folders of FIG. 2B, in accordance with the invention.

FIG. 2C illustrates an ordered list of folders 256 with associated classification scores displayed via a pull-down menu when a user engages down arrow button 257. Ordered list of folders 256 and associated classification scores are generated by decision engine 212, based upon the content of the e-mail and decision engine 212's classification criteria. Ordered list of folders 256 are displayed in descending order according to classification score. Thus, decision engine 212 ranks a spam folder 270 with an associated classification score of eight-nine as a first folder, an R&D publication folder 271 with an associated classification score of fifty-four as a second folder, an R&D budget folder 272 with an associated classification score of forty-eight as a third folder, and a personal folder 273 with an associated classification score of eight as a fourth folder. In one embodiment of the invention, a classification score for a given folder or a given action is a statistical determination of the likelihood that the content of the communication is associated with the given folder or the given action. The classification scores are calibrated such that a classification score represents the statistical likelihood that the given item in the set of attributes is the appropriate response to the communication. A classification score is meaningful standing alone, not just in comparison with other classification scores. Calibration of the classification scores allows system 100 to be "self-aware."

In another embodiment of the invention, a configuration of UI 250 is based upon classification scores associated with various console elements such as buttons, task bars, consoles, and controls. Furthermore, a classification score associated with a given console button, for example, is a statistical determination of the likelihood that the content of a given communication is associated with the given console button.

Referring back to FIG. 2B, folder list 264 includes folders 265 and subfolders 266, and a user highlighted folder Inbox 265*a*. Message list 267 includes messages 268 associated with highlighted folder Inbox 265*a*. A user selects one of the ordered folders 270-273 (FIG. 2C) or a folder or subfolder from folder list 264, or creates a new folder via selection of new button 255*a*, and then selects move button 258 to store highlighted e-mail message 1 268*a* in the selected folder.

Additionally, a user may submit text to input window 260 describing a task to be performed by system 100. The submitted text may only be a partial description of the task expressed in natural language. Then, the user clicks action button 262 and decision engine 212 analyzes the submitted text. Decision engine 212 then sends an ordered list of tasks to the application and the application displays the ordered list of tasks in the input window or via a pull-down menu associated with action button 262. For example, the user may type the phrase "create a new document" in input window 260, click action button 262, and then select from an ordered list of tasks, such as "create a new e-mail document," "create a new text document," and "create a new HTML document." If the user selects "create a new e-mail document," the e-mail application opens a new blank e-mail document.

Figure 3:
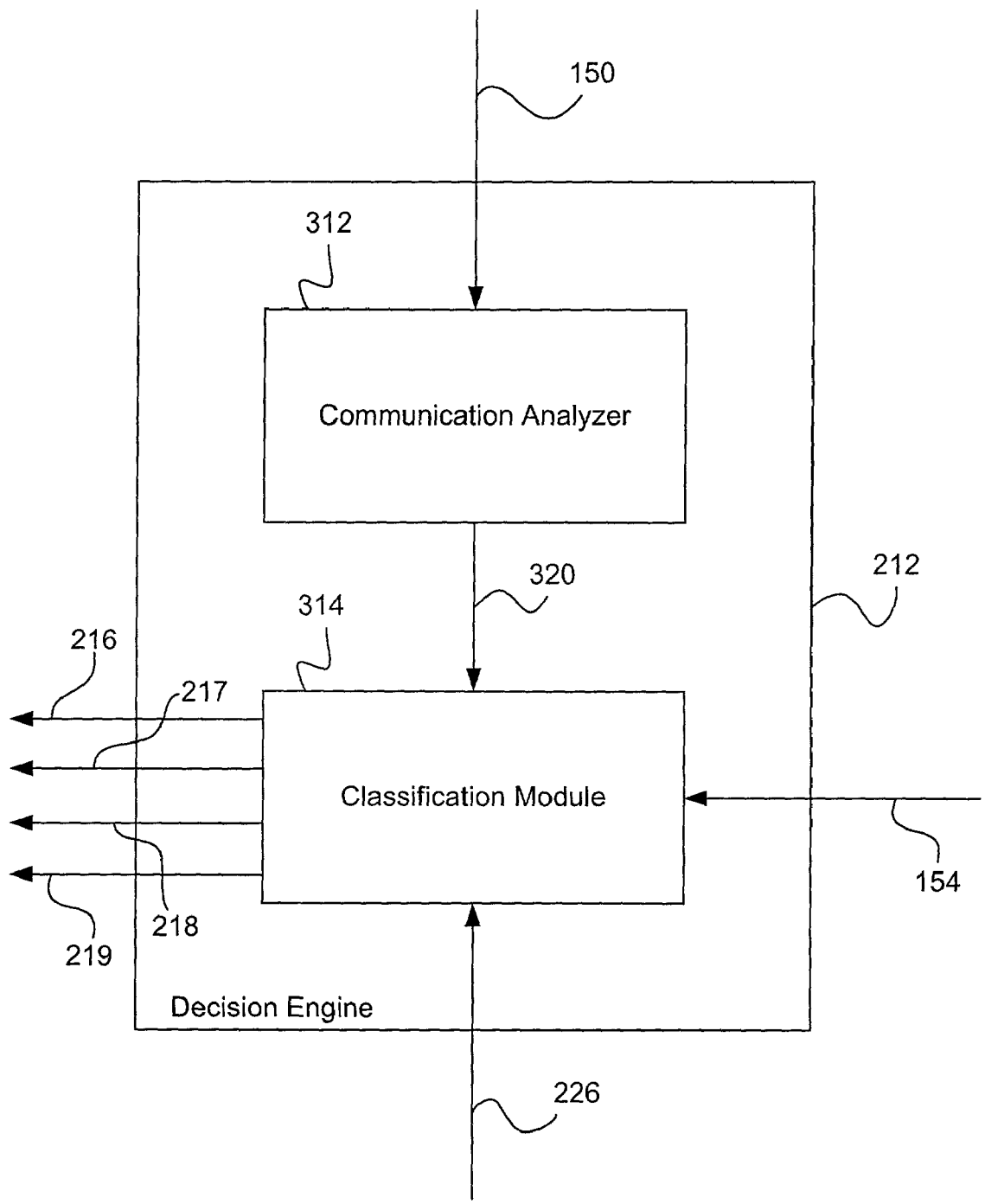
FIG. 3 is a block diagram of one embodiment of the decision engine of FIG. 2A, in accordance with the invention.

FIG. 3 is a block diagram of one embodiment of the FIG. 2 decision engine 212 in accordance with the invention. The FIG. 3 embodiment of decision engine 212 includes, but is not limited to, a communication analyzer 312 and a classification module 314. Communication analyzer 312 receives communications via path 150 from contact center 112.

In the FIG. 3 embodiment, communication analyzer 312 analyzes content of each communication to identify concepts, and may also identify relationships between the concepts. Concepts may be as general as single words from text documents, or may be as specific as field descriptors from a web-based form. Communication analyzer 312 preferably includes a natural language processor that analyzes content of text communications expressed in natural language. In another embodiment, communication analyzer 312 identifies keywords in each text communication to determine content of the communication. Communication analyzer 312 may also include a voice communication processor (not shown) that analyzes communications received via a voice-based channel, where these voice communications were not converted to text by contact center 112, and a multi-media communication analyzer (not shown) that analyzes multi-media communications such as HTML documents that contain text and graphics.

Communication analyzer 312 sends the analysis results, such as the concepts and relationships, via path 320 to classification module 314. Classification module 314 compares the analysis results with its classification criteria and assigns a set of attributes to each communication. In one embodiment, the set of attributes may be an ordered list of file folders. In another embodiment, the set of attributes may be an ordered list of actions. In another embodiment, the set of attributes may be a UI configuration.

Classification module 314 may determine a set of attributes based on the nature of the communications received by system 100 and classification guidelines established by the system user. For example, if the system user is an employee of a financial institution, then the communications received by system 100 may be fund transfers, loan applications, or other similar types of communications. A set of attributes that are associated with each communication may be based on service level agreements with customers, dollar amounts mentioned in the communications, and other similar criteria.

In another example, if the system user is a scientist at an academic institution, then the communications received by system 100 may be e-mails from other scientists, research proposal documents, budget documents, or abstracts of journal articles received from an on-line library. A set of attributes that are associated with each communication may be based on scientists' names, research topics, journal article publication dates, and other similar criteria. In another example, if the system user is the user of a news service, a set of attributes may be based on geographic region, mention of a particular individual, or subject matter such as crime, politics, or lifestyle.

In the preferred embodiment, classification module 314 is a learning system. One embodiment of a learning system is described in U.S. patent application Ser. No. 09/754,179, filed Jan. 3, 2001, and entitled "System and Method for Electronic Communication Management," which is hereby incorporated by reference.

In one embodiment, classification module 314 learns which items are mostly likely to be associated with which communications based on the selection of items by a system user from a displayed set of attributes. Classification module 314 receives feedback via path 226 from monitoring module 214. For example, the feedback may be positive or negative with various graduations of feedback. In one embodiment of the invention in which the set of attributes is an ordered list of items, feedback may be considered positive if the system user selects the first listed item from the displayed ordered list of items. Feedback may be considered negative if the system user selects an item from the displayed ordered list of items that is not the first listed item, or if the user selects an item that is not included in the displayed ordered list of items.

Classification module 314 utilizes the feedback to update its classification criteria. In this embodiment, classification module 314 learns the new classification criteria via feedback from monitoring monitor 214 when the system user selects items from the set of attributes. In this way, a system user's actions of selecting items from the set of attributes adjust the classification criteria of classification module 314. Thus, when a system user indicates changes in classification criteria by adjustments to the system user's pattern of item selection for a particular communication, system 100 may remain online with no interruptions in operation as classification module 314 learns the changes in the selection patterns of the system user. Classification module 314 may process the feedback in real-time to update the stored classification criteria with no time delay or interruption of electronic interaction system 100 service, or classification module 314 may process the feedback "on-line" with no interruption of electronic interaction system 100 service, but with a variable time delay dependent upon electronic interaction system 100 workload or other operating factors.

Since, in the preferred embodiment, classification module 314 is a learning system, new types of communications may be received by system 100 and based on the selections of system users, classification module 314 learns to develop a set of attributes for the new types of communications. Thus, system 100 may receive new types of communications and learns to associate sets of attributes with the new types of communications with no interruptions in operation.

In another embodiment, classification module 314 is a rule-based system. Classification module 314 assigns a set of attributes to a communication according to a predetermined set of classification rules. An exemplary rule may be that communications with the phrase "five hundred dollars" will have one set of attributes, while communications with the phrase "mom" will have another set of attributes. These rules typically remain unchanged until the system user affirmatively changes them. In the rule-based embodiment, classification module 314 may also receive feedback from monitoring module 214. The feedback may be periodically compared to the rules to determine if a rule may need to be modified. The rules may establish general guidelines that are refined by feedback.

Figure 4:
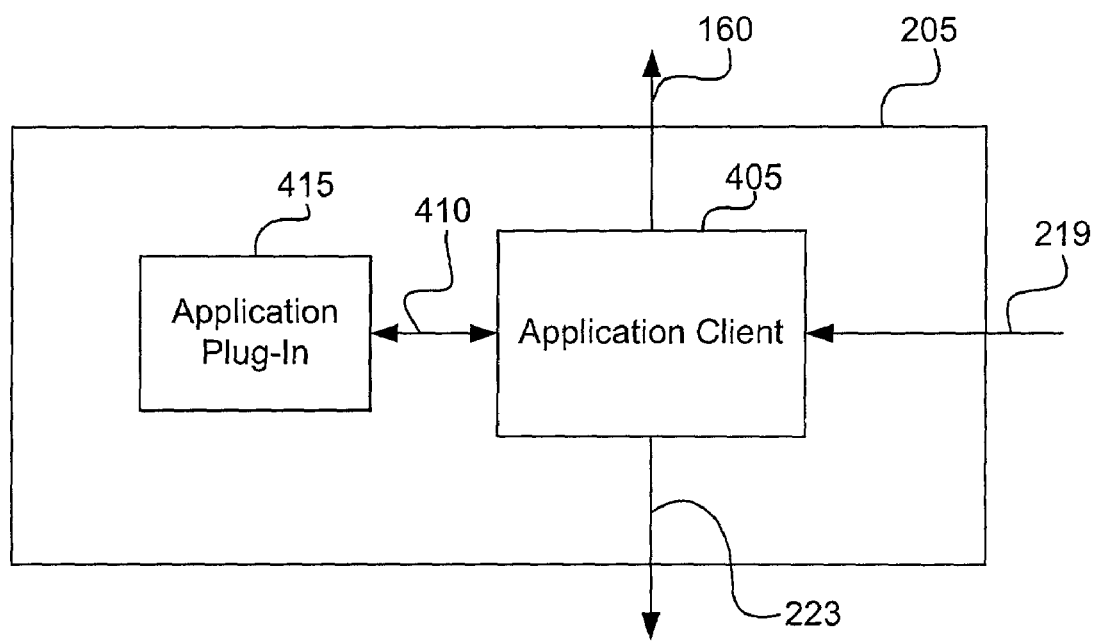
FIG. 4 is a block diagram of one embodiment of an application of FIG. 2A, in accordance with the invention.

FIG. 4 is a block diagram of one embodiment of the FIG. 2 application 205 in accordance with the invention. The FIG. 4 embodiment of application 205 includes, but is not limited to, an application client 405 and an application plug-in 415. Application client 405 may be an e-mail client, a facsimile client, a Web-browser client, a VoIP client, or other types of multimedia or communication-based application clients. Application plug-in 415 is software that operates with application client 405 to provide additional support to application client 405. For example, in one embodiment of the invention in which a set of attributes is an ordered list of items, application plug-in 415 assists application client 405 in processing the ordered list of items for performing an action, such as displaying the ordered list of items.

Application client 405 receives a communication and a set of attributes from decision engine 212 via path 219. Application client 405, with the assistance of application plug-in 415, processes the communication and its associated set of attributes for display on a monitor (not shown), for example. When the system user selects an item from the displayed set of attributes, the communication and the selected item is sent to monitoring module 214 via path 223. In addition, if the selected item is an action item which requires communication with contact center 112, the communication is sent to contact center 112 for further processing via path 160.

In another embodiment of determining a set of attributes associated with a communication, application client 405, for example, receives a communication from contact center 112 and sends the communication to decision engine 212 for further processing and analysis. Decision engine 212 determines a set of attributes associated with the communication and sends the communication and the set of attributes to application client 405.

Figure 5:
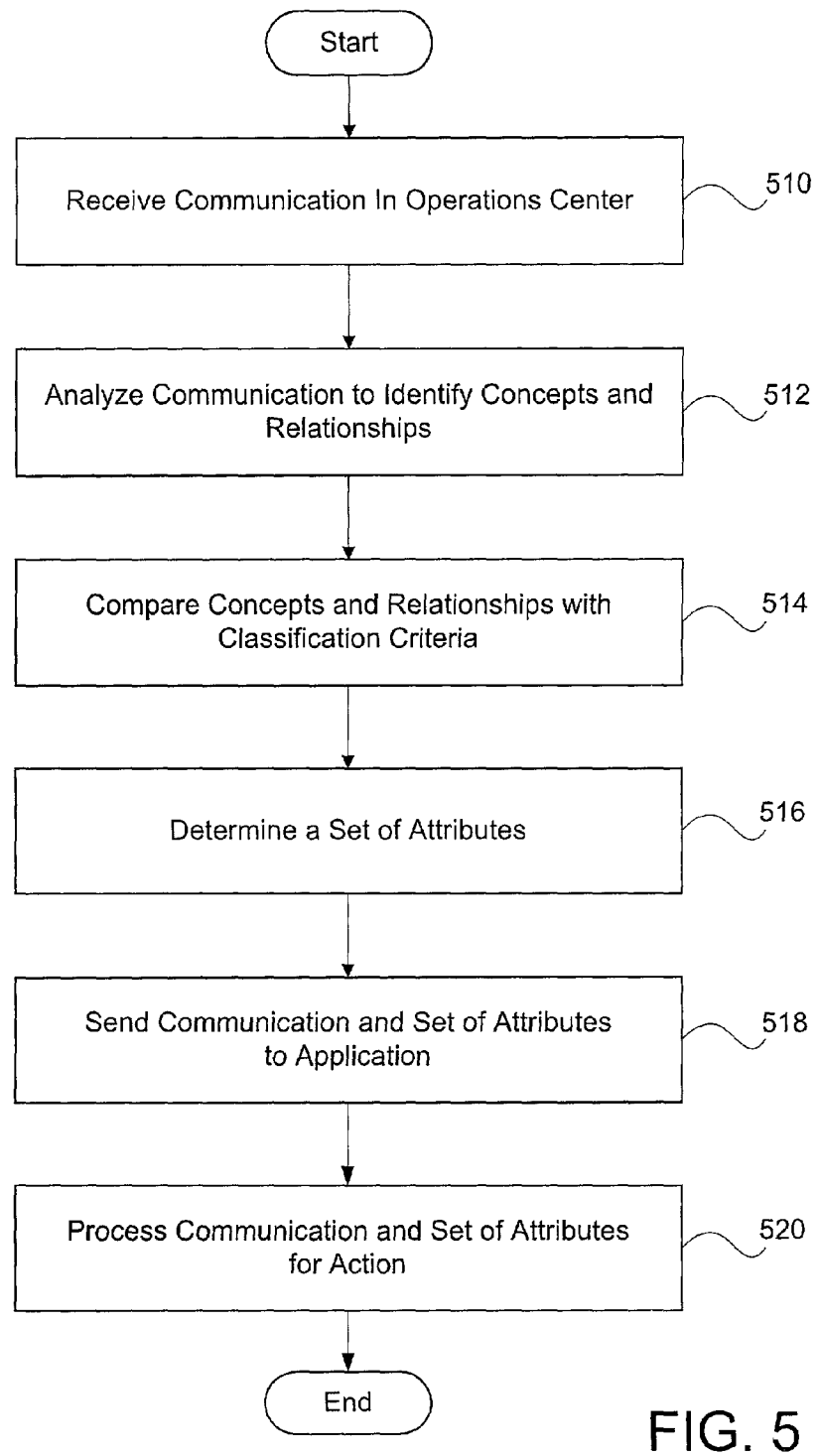
FIG. 5 is a flowchart of method steps for determining a set of attributes for a communication, in accordance with one embodiment of the invention.

FIG. 5 is a flowchart of method steps for determining a set of attributes in accordance with one embodiment of the invention. First, in step 510, operations center 114 receives a communication from contact center 112. In step 512, decision engine 212 analyzes the communication to identify concepts and the relationships between the concepts. Alternatively, decision engine 212 identifies keywords in the communication. Then, in step 514, classification module 314 (FIG. 3) compares the concepts and relationships with its classification criteria. In the preferred embodiment, classification module 314 learns the classification criteria from feedback. In another embodiment, classification module 314 compares the concepts and relationships with a predetermined set of rules for determining attributes.

In step 516, classification module 314 determines a set of attributes associated with the communication. Then, in step 518, classification module 314 sends the communication and the set of attributes to the communication's corresponding application such as application 405, for example. Finally, in step 520, application 405 in conjunction with application plug-in 415 processes the communication and the set of attributes for performing an action. For example, the set of attributes may be displayed on a monitor (not shown), and may include lists of prioritized folders, lists of prioritized actions, and various UI configurations.

Figure 6:
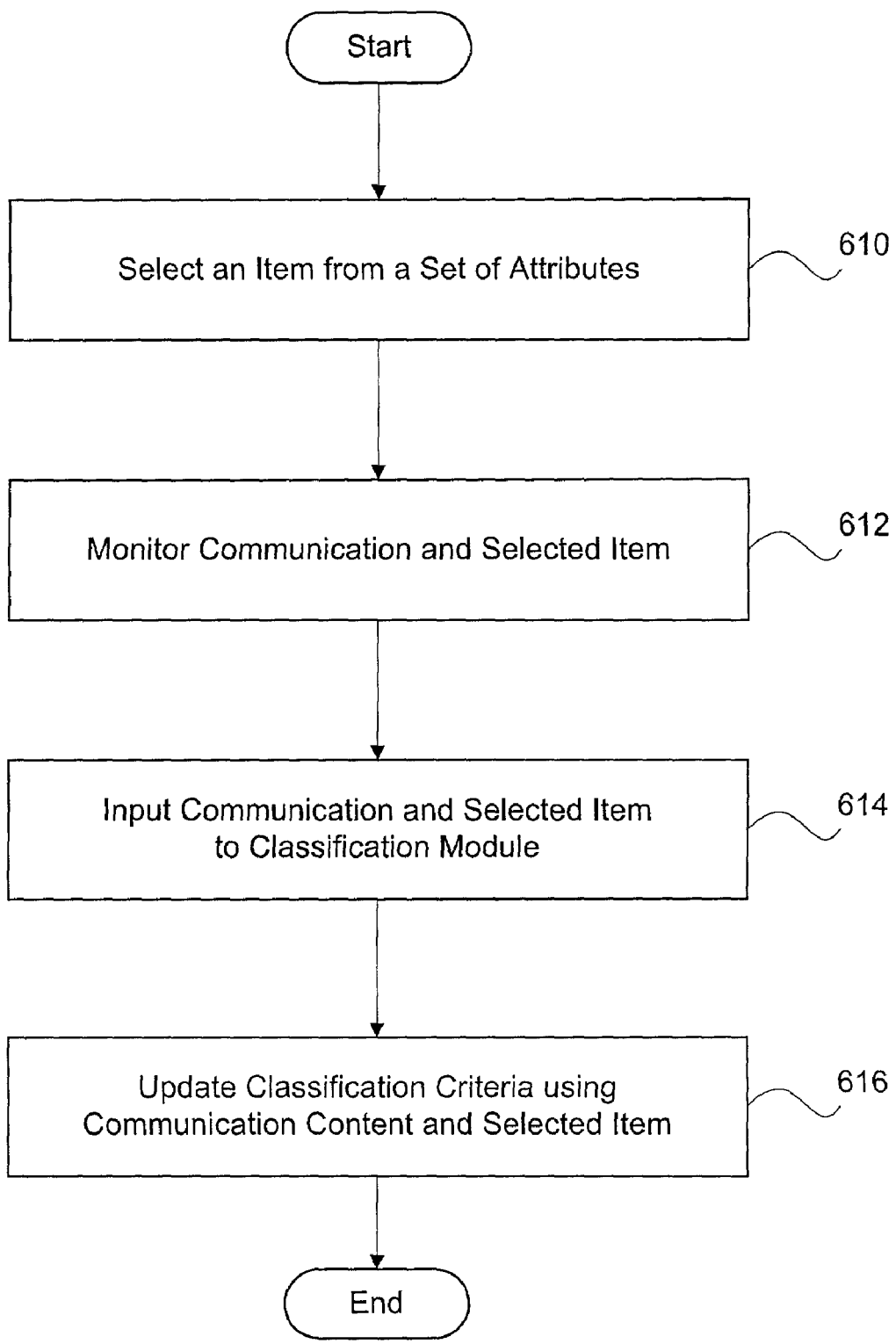
FIG. 6 is a flowchart of method steps for updating the operations center of FIG. 1, in accordance with one embodiment of the invention.

FIG. 6 is a flowchart of method steps for updating the FIG. 2 decision engine 212 in accordance with one embodiment of the invention. First, in step 610, the user of system 100 selects an item from a set of attributes. For example, if the set of attributes is an ordered list of items, then the user selects an item from the displayed ordered list of items. Alternatively, the user selects an item not displayed in the ordered list of items.

Next, in step 612, monitoring module 214 monitors the item selected from the list. In step 614, monitoring module 214 inputs the communication and the selected item to classification module 314. Then, in step 616, classification module 314 uses the communication's content and selected item to update the classification criteria. The communication's content includes concepts and their relationships.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A system for assigning a set of attributes to communications, comprising:
 a contact center configured to receive a communication from another party via a communications channel;
 a decision engine configured to analyze said received communication to identify its content, including concepts in the communication and relationships between said concepts, and then determine a set of attributes for said received communication based on said content using classification criteria, wherein said set of attributes is an ordered list of items comprising actions to be performed;
 at least one application to process said set of attributes for performing an action according to said set of attributes; and
 a monitoring module configured for monitoring a user's response to said action to provide feedback to said decision engine in order for said decision engine to update said classification criteria.

2. The system of claim 1, wherein said decision engine includes a communication analyzer configured to analyze content of said received communication.

3. The system of claim 1, wherein said communication is a text communication and said decision engine includes a communication analyzer configured to analyze text of said text communication.

4. The system of claim 3, wherein said text communication contains natural language.

5. The system of claim 2, wherein said communication analyzer identifies concepts of said received communication.

6. The system of claim 5, wherein said communication analyzer identifies relationships between said concepts.

7. The system of claim 5, wherein said decision engine compares said concepts with classification criteria to determine said set of attributes and a classification score for each item in said set of attributes.

8. The system of claim 7, wherein said set of attributes is an ordered list of items arranged according to classification score, from a highest classification score to a lowest classification score.

9. The system of claim 7, wherein each classification score is a determination of the statistical likelihood that the item is a proper response to said communication.

10. The system of claim 7, wherein said set of attributes includes a configuration of user-interface components.

11. The system of claim 2, wherein said communication analyzer analyzes said received communication by identifying keywords in said received communication.

12. The system of claim 1, wherein said at least one application is configured to process said set of attributes for displaying said set of attributes to said user of said system.

13. The system of claim 12, wherein said at least one application is configured to display said set of attributes as an ordered list of items arranged according to classification score, from a highest classification score to a lowest classification score.

14. The system of claim 1, wherein said communication is a multimedia communication and said decision engine includes a communication analyzer configured to analyze content of said multimedia communication.

15. The system of claim 1, wherein said communication is a voice communication and said decision engine includes a communication analyzer configured to analyze content of said voice communication.

16. The system of claim 1, wherein said user selects an item from said set of attributes for said received communication.

17. The system of claim 16, wherein said monitoring module is configured to monitor said item selected by said user and to provide said selected item and said received communication as feedback to said decision engine.

18. The system of claim 17, wherein said decision engine utilizes said feedback to adjust classification criteria used to determine said set of attributes for said received communication.

19. The system of claim 18, wherein said decision engine uses said feedback to update said classification criteria in real time.

20. The system of claim 18, wherein said decision engine uses said feedback to update said classification criteria online.

21. The system of claim 1, wherein said decision engine includes a communication analyzer configured to analyze said received communication and a classification module configured to receive analysis results from said communication analyzer and determine said set of attributes for said received communication.

22. The system of claim 21, wherein said classification module is a learning system and receives feedback from said monitoring module that monitors said set of attributes processed by said application and selections of said user.

23. The system of claim 21, wherein said classification module is a rule-based system that determines said set of attributes according to a set of predetermined rules.

24. The system of claim 1, wherein said set of attributes is determined in accordance with classification criteria established by said user of said system.

25. A method for assigning a set of attributes to communications, comprising:

receiving a communication from another party via a communications channel;

analyzing said received communication to identify its content, including concepts in the communication and relationships between said concepts, and then determining a set of attributes for said received communication based on said content using classification criteria, wherein said set of attributes is an ordered list of items comprising actions to be performed;

processing said set of attributes for performing an action according to said set of attributes; and monitoring a user's response to said action to provide feedback to said analyzing and determining step in order for said analyzing and determining step to update said classification criteria.

26. The method of claim 25, wherein said communication is a text communication and the step of determining said set of attributes includes analyzing text of said text communication.

27. The method of claim 26, wherein said text communication contains natural language.

28. The method of claim 25, wherein analyzing content of said communication includes identifying concepts of said received communication.

29. The method of claim 28, wherein analyzing content of said communication further includes identifying relationships between said concepts.

30. The method of claim 29, wherein the step of processing said set of attributes for performing an action includes processing said set of attributes for displaying said set of attributes to said user.

31. The method of claim 30, wherein displaying said set of attributes includes displaying said set of attributes as an ordered list of items arranged according to classification score, from a highest classification score to a lowest classification score.

32. The method of claim 28, wherein the step of determining said set of attributes includes comparing said concepts with classification criteria and determining a classification score for each item in said set of attributes.

33. The method of claim 32, wherein said set of attributes is an ordered list of items arranged according to classification score, from a highest classification score to a lowest classification score.

34. The method of claim 32, wherein each classification score is a determination of the statistical likelihood that the item is a proper response to said communication.

35. The method of claim 32, wherein said set of attributes includes a configuration of user-interface components.

36. The method of claim 25, wherein analyzing said received communication includes identifying keywords in said received communication.

37. The method of claim 25, wherein said communication is a multimedia communication and the step of determining said set of attributes includes analyzing content of said multimedia communication.

38. The method of claim 37, further comprising the step of converting said multimedia communication into a text communication prior to determining said set of attributes.

39. The method of claim 25, wherein said communication is a voice communication and the step of determining said set of attributes includes analyzing content of said voice communication.

40. The method of claim 39, further comprising the step of converting said voice communication into a text communication prior to determining said set of attributes.

41. The method of claim 25, wherein said user selects an item from said set of attributes for said received communication.

42. The method of claim 41, wherein the step of monitoring further comprises the step of monitoring said item selected by said user and utilizing said selected item and said received communication as feedback.

43. The method of claim 42, further comprising the step of processing said feedback in real time.

44. The method of claim 42, further comprising the step of processing said feedback online.

45. The method of claim 42, wherein utilizing said selected item and said received communication includes adjusting classification criteria used to determine said set of attributes for said received communication.

46. A system for assigning a set of attributes to communications, comprising:
   means for receiving a communication from another party via a communications channel;
   means for analyzing said received communication to identify its content, including concepts in the communications and relationships between said concepts, and then determining a set of attributes for said received communication based on said content using classification criteria, wherein said set of attributes is an ordered list of items comprising actions to be performed;
   means for processing said set of attributes for performing an action according to said set of attributes; and
   means for monitoring a user's response to said action to provide feedback to said means for analyzing and then determining in order for said means for analyzing and then determining to update said classification criteria.

47. A system for assigning a set of attributes to documents, comprising:
   a contact center configured to receive a document from another party via a communications channel;
   a decision engine configured to analyze said received document to identify its content, including concepts in the communication and relationships between said concepts, and then determine a set of attributes for said received document based on said content using classification criteria, wherein said set of attributes is an ordered list of items comprising actions to be performed;
   at least one application to process said set of attributes for performing an action according to said set of attributes; and
   a monitoring module configured for monitoring a user's response to said action to provide feedback to said decision engine in order for said decision engine to update said classification criteria.

48. A system for determining a set of attributes, comprising:
   a decision engine configured to receive a communication from another party via a communications channel, to analyze said received communication to identify its content, including concepts in the communication and relationships between said concepts, and then to determine a set of attributes for said received communication based on said content using classification criteria, wherein said set of attributes is an ordered list of items comprising actions to be performed;
   at least one application to process said set of attributes for display according to said set of attributes; and
   a monitoring module configured to monitor a user's selection of an item from said displayed set of attributes and to forward said selected item and said received communication as feedback to said decision engine such that said decision engine uses said feedback to update said classification criteria.

49. The system of claim 48, wherein said decision engine uses said feedback to update said classification criteria in real time.

50. The system of claim 48, wherein said decision engine uses said feedback to update said classification criteria online.

* * * * *